United States Patent
Rekemeyer

[11] Patent Number: 6,058,749
[45] Date of Patent: May 9, 2000

[54] COMBINATION ANTI-SKID ANTI-THEFT AND VEHICLE LIFTING SYSTEM

[76] Inventor: Edward Rekemeyer, 250 Vliet Blvd., Cohoes, N.Y. 12047

[21] Appl. No.: 08/964,000

[22] Filed: Nov. 4, 1997

[51] Int. Cl.[7] .................................................. B60R 25/00
[52] U.S. Cl. .............................. 70/226; 70/237; 70/258; 70/14; 70/225
[58] Field of Search ................................ 152/225 R, 226; 254/133 R, 134, 108, 100; 70/237, 258, 225, 226, 14, 19, 18, 259, 260

[56] References Cited

U.S. PATENT DOCUMENTS

| | | | |
|---|---|---|---|
| 652,550 | 6/1900 | Robinson | 254/108 |
| 1,179,825 | 4/1916 | Greutmann et al. | 254/108 |
| 2,630,297 | 3/1953 | Hunz | 254/133 R |
| 2,717,019 | 9/1955 | Baldwin | 152/226 |
| 2,820,501 | 1/1958 | Heuneman | 152/226 |
| 3,053,302 | 9/1962 | Bopst, III | 152/226 |
| 3,313,523 | 4/1967 | Reynolds | 254/133 R |
| 4,432,432 | 2/1984 | Martin | 254/133 R |
| 4,662,417 | 5/1987 | Lee | 152/225 C |
| 5,224,687 | 7/1993 | Geckler et al. | 254/133 R |
| 5,379,987 | 1/1995 | Cleary | 254/134 |
| 5,499,795 | 3/1996 | Mathews | 254/30 |
| 5,724,839 | 3/1998 | Thering | 70/238 |
| 5,787,742 | 8/1998 | Lewis et al. | 70/238 |

FOREIGN PATENT DOCUMENTS 112611  7/1984  European Pat. Off. ........... 152/225 C

*Primary Examiner*—B. Dayoan
*Assistant Examiner*—John B. Walsh
*Attorney, Agent, or Firm*—Jay R. Yablon

[57] ABSTRACT

Disclosed herein is a combination anti-skid, anti-theft and vehicle lifting device. In particular, the device disclosed herein attaches easily and quickly to a vehicle tire to help extract the tire and the vehicle to which it is attached from ice, mud, snow, or other immobilizing medium. It also converts readily to a conventional vehicle lifting jack for changing tires. It also converts readily to a "tire boot" and so can be used to prevent vehicle theft. Finally, it is readily convertible to as to immobilize the vehicle steering wheel, also for theft prevention.

17 Claims, 6 Drawing Sheets

COMBINATION ANTI-SKID ANTI-THEFT AND VEHICLE LIFTING SYSTEM

FIELD OF THE INVENTION

This invention relates generally to the field of utility tools for automotive vehicles, and in particular, discloses a multipurpose utility device that can be used to move a car stuck in ice or snow, which can secure the vehicle against theft, and which can also function as a traditional vehicle lifting jack.

BACKGROUND OF THE INVENTION

There exist today many tools for a motor vehicle owner that are use to provide assistance in a variety of difficult situations. The most common of these tools—a lifting jack—is used to lift a motor vehicle's tire off the ground in order to change such tire when it goes flat. Such jacks are indeed considered standard equipment for any motor vehicle, and are invariably provided by vehicle manufacturers with the purchase of a motor vehicle.

While it is certainly annoying and trying to have to change one's tire when it becomes flat, getting stuck in ice, mud or snow can be equally difficult. Indeed, in cold-weather climates, having one's vehicle immobilized in ice or snow occurs just as frequently, if not more frequently, than having a tire go flat. It would be desirable, therefore, if drivers had available to them, a tool that could be used to enable such tire to grip the ice or snow for ready extraction of the vehicle, which is as ubiquitous and easy-to-use as an ordinary vehicle jack. Without such a readily available tool, it is necessary for the driver of the immobilized vehicle to call a tow truck or similar vehicle and then wait for assistance.

Vehicle theft is also a serious problem for vehicle owners. Various alarms and security systems, as well as so-called "tire boots" have been devised to prevent theft. But security systems are expensive, and carrying around an extra boot device is cumbersome and consumes precious vehicle cargo space.

The prior art includes many jack-type lifting devices, such as the standard ratchet-bar jack that lifts the vehicle straight up for tire removal, and the pantograph-type jack such as is shown in U.S. Pat. No. 4,092,012. But, these jacks are generally limited to a single purpose, namely lifting, when in fact their ratchet mechanisms could be adapted to other purposes as well.

U.S. Pat. No. 3,991,977 shows an interesting adaptation of a standard ratchet-bar jack to help extract a vehicle when such vehicle is stuck. In its ordinary application, the ratchet bar pushes apart, providing upward force to lift a vehicle. In its extraction application, the ratchet bar pulls together. When one end of the ratchet bar is attached via a chain or similar device to a stake in the ground or other immobile object, and the other end is attached via a chain or similar device to the vehicle, the pulling together of the jack serves to help extract the vehicle from its stuck situation. However, the device in this patent is difficult to use, in that one must have an immobile object nearby for chain attachment, or must have available a stake as well as a sledge-type hammer to drive the stake into the ground. Further, this invention requires the user to iteratively hook and unhook the chains using a pin mechanism as the jack contracts, and iteratively reexpand and recontract the jack. This is quite cumbersome. One would expect that the time required to set up and use this device, particularly in cold, blustery weather, is substantial. What is meritorious about this device, is that both the lifting (jack) and the extraction functions are achieved by a single, dual-function device, and that the jack bar that one already has in the vehicle, is used to serve a second purpose.

The prior art does disclose other devices that are specifically, solely, designed to stop skidding of tire wheels, and thus help extract a vehicle that is stuck in ice or snow. Yet, there are a number of defects common to all of these. For example, U.S. Pat. Nos. 4,036,273, 4,228,838, 4,960,159, 4,960,160, and 5,033,522, are essentially chain replacement devices. All of these involve complicated hardware, and are designed for more permanent tire use. They most certainly cannot be easily mounted into the tires in perhaps 20 or 30 seconds, or removed in a few seconds once extraction is completed. Further, the hardware attachments themselves are quite complicated. As these devices are used in adverse (e.g., wet, icy, muddy) road conditions, it seems that with all the springs, pulleys, wires, etc., used by these devices, the opportunity for mud, sand, ice, salt, etc., to get stuck in, and ruin these devices, is quite high.

U.S. Pat. No. 5,156,695 requires that an adapter plate be mounted to the vehicle wheel, which is cumbersome and does not lend itself to a 20 to 30-second attachment that would be desirable during an immobilization emergency. The device in U.S. Pat. No. 5,540,267 must similarly be secured to the wheel. U.S. Pat. No. 5,454,412 requires the wheels to have holes in them (hub caps off), and requires the installer to bend down behind the back side of the tire to pull these devices through. This must be done as many times as there are strips being installed, so, for example, if four strips were being installed, this procedure would be performed four times over in sequence. Similarly, U.S. Pat. No. 4,116,254 is useful only for wheels with holes in them, which eliminates its applicability for many vehicles. U.S. Pat. No. 4,386,643 is also very cumbersome to use, requiring a great deal of preadjustment before use. U.S. Pat. No. 4,209,049 also involves a great deal more hardware than is desirable (see, e.g., FIG. 4 therein), and is thus cumbersome to use. U.S. Pat. No. 4,176,704 also appears more cumbersome than is necessary.

Also, none of the above-reference patents disclose how they can be used for tires of varying tread width, and are limited to a single tread width of tire. A vehicle owner with two different vehicles having two different tire tread widths would need to purchase two different such devices.

U.S. Pat. Nos. 4,122,881 and 4,872,496 utilize less extraneous hardware than the other devices cited above, but still require a fair amount of time and work to be mounted on a tire. U.S. Pat. No. 4,192,367 appears to be the simplest of all the devices disclosed in the prior art, but the grip surface can clearly be improved, and it would be desirable for this device to adjust to different tread widths. It would also be desirable if the user could gain more control over the positioning (spacing) of the grip surface around the circumference of the tire. Also, this device, like all the others discussed above (except U.S. Pat. No. 3,991,977), is confined solely to a single purpose, namely, vehicle extraction. It would be desirable, so long as one is already carrying around vehicle safety hardware, to have that hardware be useful for several commonly-needed functions.

The prior art, e.g., U.S. Pat. Nos. 4,651,849, 4,833,442 and 4,854,144 also discloses various "tire boot" anti-theft devices. Yet the process of mounting many of these is rather cumbersome, and these too, are confined to a single purpose, namely, vehicle immobilization to prevent theft.

It would be desirable if a single, multipurpose device were available which can be easily adapted to perform several functions, namely: lifting a vehicle so that a tire can be changed (i.e., vehicle jack); extracting a vehicle from ice, mud, snow, etc.; immobilizing a vehicle against theft (i.e., vehicle boot); and even locking the inside steering wheel so that it cannot be turned, which is also prevents theft. Such a device should be simple and easy to use, should be capable of deployment in a very brief time period, and should be compact for easy storage. Such a device could then be used and stored as ubiquitously and conveniently as a conventional jack, but would provide the vehicle user with safety and security for a wider range of vehicle problems. Such a device should be useful for tires of any tread width.

OBJECTS OF THE INVENTION

It is therefore and object of the invention to provide a single, modularly-adaptable vehicle tool that can be used to perform the varying functions of lifting a vehicle for changing a tire, extracting a vehicle from ice, snow, mud, etc., and securing a vehicle against theft.

It is a further object of the invention that this device be simple and easy to use, admitting of very rapid deployment for use and very rapid removal following use.

It is a further object of the invention that this device avoid the use of cumbersome chains and similar devices, and that it minimize the overall use of hardware pieces.

It is a further object to provide a device that is easy and quick to secure to and remove from a tire in emergency situations.

It is a further object of this invention that this device be capable of compact storage.

SUMMARY OF THE INVENTION

This invention is an vehicle safety and security system which makes use of a reversible ratchet bar (i.e., a ratchet bar that by operation of a directional switch can be set to either "push" apart or "pull" together whatever is connected to its ends), as well as several modular attachment components which attach to its ends to serve several functions as outlined below.

One set of modular attachments are a vehicle lifting base and a vehicle lifting mount. When these are attached to the ratchet bar, the base is placed on a roadway beneath the vehicle, the vehicle lifting mount is placed under and in contact with the vehicle in an appropriate lifting location, the ratchet bar is set to push apart, and by said pushing apart operation of the ratchet bar, the vehicle lift component and the jack base are pushed apart and the vehicle is thereby lifted.

Another modular attachment is a pair of (friction-enhancing) anti-skid grip modules, which are optionally of adjustable width so as to be compatible with a range of tire tread widths. Each said grip module attaches to one end of the ratchet bar and is secured in proper orientation by a pair of grip module attachment joints. The entire configuration is then secured about the perimeter of a vehicle tire. The ratchet bar is set to pull together (rather than push apart), and when the ratchet bar is operated, the pulling action of the ratchet bar on the anti-skid grip modules causes the modules to be secured snugly to a drive tire of the vehicle. Once this configuration is secure about the drive tire, the drive tire is rotated (driven), and the attached gripping modules provide additional friction that can help extract the car.

Another modular attachment is a pair of boot modules. These attach to the ratchet bar similarly to the anti-skid grip modules and are also secured by utilizing the ratchet bar in its pulling mode, but have a different configuration designed to prevent tire rotation and make it difficult to drive the vehicle while they are attached. Of course, when the boot is used, a locking apparatus is provided to lock the boot in place so it cannot be removed by someone other than the individual possessing the means to unlock the boot.

Another modular attachment, also used when the ratchet bar is in its pulling mode, is a steering wheel module and a complementary brake shaft module. The steering wheel component is attached about the steering wheel inside the vehicle, the brake shaft component is attached about the brake shaft, and the ratchet bar is tightened and then locked to pull these components toward one another. This configuration, when in place, prevents the steering wheel from being turned at all, thus making it impossible for a thief to drive away with the vehicle.

Also disclosed are several functional enhancements making use of a telescoping ratchet bar handle.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1:
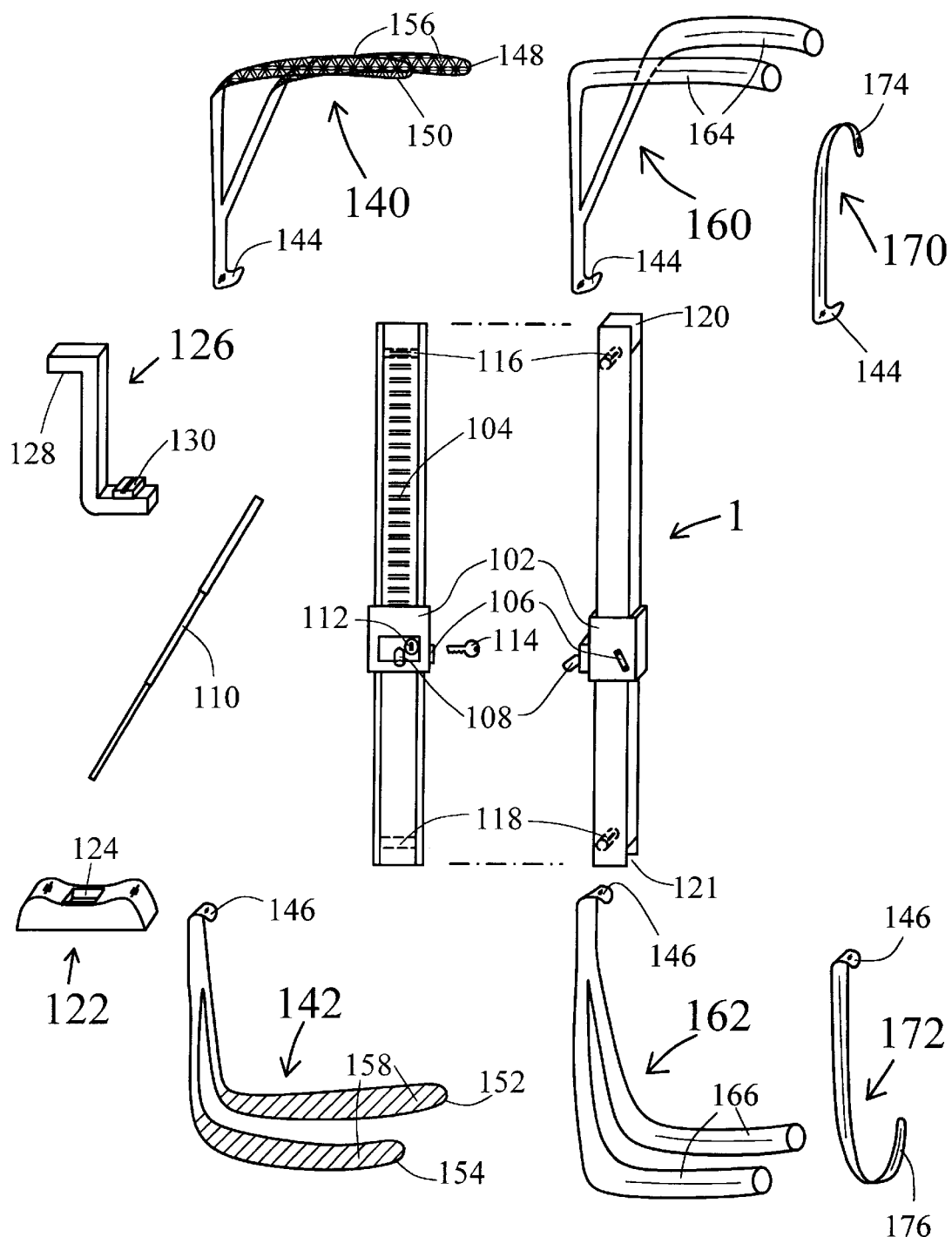
FIG. 1 depicts the various required and optional components of the preferred embodiment of the invention, in a disassembled configuration.

FIG. 1 depicts various required and optional components of the preferred embodiment of the invention, in a disassembled configuration, i.e., when these components are not yet connected together for the various uses (applications) as described below.

The primary component used for all of the varied applications to be discussed below is a reversible, bi-directional ratchet bar 1, depicted in FIG. 1 from both a front view and, projected therefrom, a predominantly right-side perspective view showing part of a rear view as well. This may be any ratchet bar known in the art that is capable of being reversibly switched to generate a force that either pushes apart or pulls together whatever is connected by or to the two ends of said ratchet bar 1.

One example of an acceptable embodiment for ratchet bar 1 is the ratchet bar component of a standard vehicle jack (vehicle jack bar), with reversibility, which is what is depicted in FIG. 1. The ratchet bar 1 comprises a drive mechanism 102, which operates to drive the ratchet bar 1 in a manner well-known in the art. In particular, a driving pawl and a holding pawl (not expressly depicted) engage ratchet bar teeth 104 of the ratchet bar 1, such that the driving pawl forces the bi-directional ratchet bar 1 to either push apart or pull together depending on the position of a directional selection mechanism 106 such as a rotatable directional lever illustrated, while the holding pawl prevents the ratchet bar from moving in a direction opposite to the direction established by directional selection mechanism 106. The drive mechanism 102 comprises a conventional drive handle receptacle 108, into which a drive handle 110 is inserted. By repetitively moving the handle 110 and thereby the receptacle 108 up and down in the customary, well-known manner, the ratchet bar 1 is thereby caused to either push apart or pull together depending on the setting of the directional selection mechanism 106. By moving the handle 110 to a release position as is also customary and well-known in the prior art, the holding pawl is made to disengage the teeth, enabling the force being exerted by the ratchet bar 1 to gradually be released. U.S. Pat. No. 3,991,977, for example, utilizes a ratchet bar similar to that described herein above, insofar as its basic bi-directional driving function is concerned.

Beyond what is customary in the art for a bi-directional ratchet drive 1 as discussed above, the ratchet bar 1 also comprises a locking device 112 such as the key receptacle depicted herein on the drive mechanism 102, and an unlocking device 114 such as the key depicted herein. These devices 112 and 114 serve to lock and unlock the driving mechanism 102 such that when that mechanism is locked, it is impossible to either drive or release the driving mechanism 102 from whatever position it is then locked into. There are of course many methods well-known in the art that could be used to lock and unlock the driving mechanism 102, including physical locks, electromechanical locks, and electronic locks, which can be implemented without undue experimentation, and which are all contemplated within the scope of this disclosure and its associated claims. One may also, for example, lock the handle 110 and thereby the receptacle 108 into an immobile position, once the ratchet bar is set to its desired position. Indeed, any means that would be obvious to someone of ordinary skill for locking the drive mechanism 102, is contemplated herein.

The handle 110 is optionally a telescoping handle as depicted, which can be collapsed and expanded along its length. Consequently, this handle can be used to gain added leverage when driving the ratchet bar 1, as well as when screwing and unscrewing nut and bolts, etc., during the process of, e.g., changing a flat tire (since said handles are typically either part of, or attachable to, the wrench-type device used to screw and unscrew nuts and/or bolts). It can also be stored compactly. Because the telescoping handle contains some hollow sections, it must be made of a sufficiently strong materials so it will not break when it is being used to apply leverage.

Additionally, the ratchet drive 1 as shown in the embodiment of FIG. 1 has an upper ratchet bar pull module attachment 116 and a lower ratchet bar pull module attachment 118, as well as an upper pull module notch 120 and a lower pull module notch 121. The pull module attachments 116 and 118 (which reside within the bar and are therefore drawn with "hidden" dashed lines) are used to secure various "pull module pairs" to the ends of the ratchet bar 1 for various applications wherein the ratchet bar is set (by directional switch 106) to pull together (versus push apart), as will be discussed. The pull module notches 120 and 121 are used to provide clearance for attachment of these pull modules to the ends of the ratchet bar 1, in the particular embodiment illustrated by FIG. 1.

We turn now to the various modular units that may be attached to the ratchet bar 1 to provide diverse application. To use this invention as a standard lifting jack, the lower end of the ratchet bar 1 is inserted into a lifting base ratchet bar receptacle 124 of a vehicle lifting base 122. Further, the upper end of the ratchet bar 1 is inserted into a lift mount receptacle 128 of a vehicle lifting mount 126 with a vehicle lift contact 130. Because of the upper-right perspective view of FIG. 1, the lift mount receptacle 128 is not expressly shown, but it is essentially a female receptacle similar to receptacle 124, into which the upper end of the ratchet bar 1 is securely fitted. Further, the drive handle 110 is telescoped to an appropriate length and inserted into the drive handle receptacle 108. Once this has all been done, the resulting configuration is that of a standard vehicle lifting jack depicted in FIG. 2, which is used in the conventional manner to lift a vehicle.

Particularly, the directional selection mechanism 106 is set in the position shown, which causes the ratchet bar 1 and its drive mechanism 102, when activated, to push apart in the direction indicated by arrows 202. The vehicle lifting base 122 is placed on the roadway beneath the vehicle, while the vehicle lift contact 130 is placed in an appropriate position beneath the vehicle to facilitate lifting. The lift contact 130 can be as depicted, or can be a hook, a flat surface, or any other device which can be placed appropriately in contact with the underside of the vehicle to facilitate lifting. Similarly, many configurations for both the base 122 and the mount 126 will occur to those of ordinary skill, and are contemplated within this disclosure and its associated claims. Finally, the drive handle 110 is pumped up and down in the conventional manner, in the direction as indicated by 204. This, via the drive handle receptacle 108 and the drive mechanism 102, causes the driving and holding pawls to engage appropriately with the ratchet bar teeth 104 (FIG. 1), to cause the vehicle to be vertically lifted upward along the line 202. If desired, the locking device 112 can be locked once the ratchet bar has lifted the vehicle to the desired height, which disables any further activation of the drive mechanism until later unlocking 114 and thereby provides and added measure of safety, ensuring that the ratchet bar will not accidentally disengage and allow the vehicle to fall while someone is near the vehicle, changing a tire for example.

Note in this application, where the ratchet bar 1 is set to push apart, that the upper pull module attachment 116 and lower pull module attachment 118, as well as the upper pull module notch 120 and lower pull module notch 121, are not at all utilized. These are used for various pulling operations as discussed below.

Figure 3:
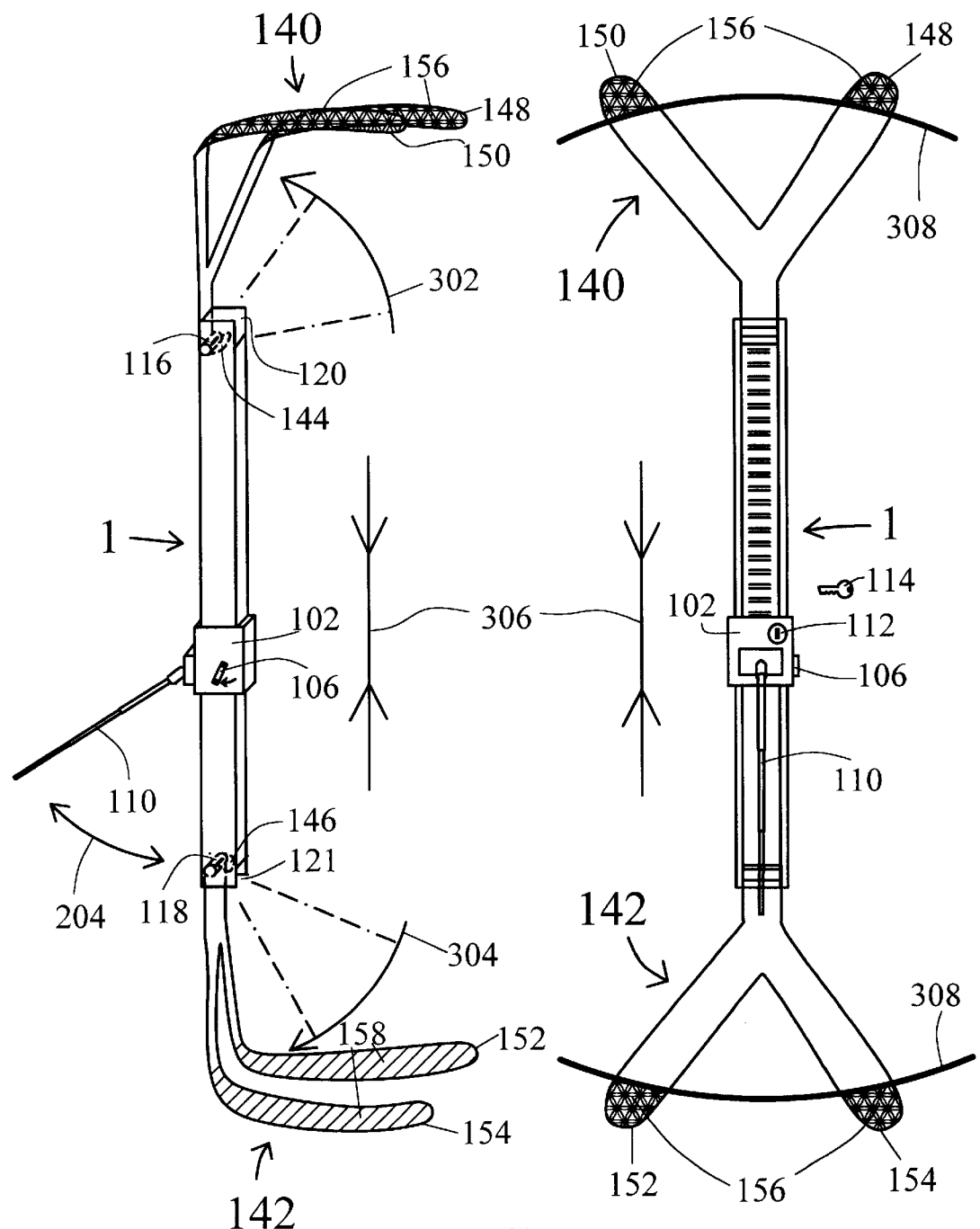
FIG. 3 depicts the preferred embodiment of the invention when it is configured as an anti-skid gripping (tire traction) device.

Returning to FIG. 1, we turn now to various pull modules which are attached to the end of the ratchet bar 1 when said bar is set to pull together at its ends. When it is desired to extract an immobilized vehicle from ice, mud, snow, or some other road condition for which additional friction between the tire and the road surface is desirable, a pair of upper (140) and lower (142) anti-skid tire gripping (friction-enhancing) modules may be respectively attached to the upper and lower pull module attachments 116 and 118 of the reversible ratchet bar 1. An upper pull module attachment 144 such as the upper attachment lip depicted in FIG. 1, fits snugly beneath the upper pull module attachment 116 as depicted in FIG. 3, while a lower pull module attachment 146 such as the lower attachment lip depicted in FIG. 1 fits snugly above the lower pull module attachment 118. In the embodiment depicted, these gripping modules 140 and 142 are attached to the ratchet bar ends by holding them approximately perpendicular to their desired orientation, sliding the attachment lips 144 and 146 beside and beneath the pull module attachments 116 and 118, and then rotating the modules 140 and 142 by approximately ninety degrees as shown by the arrows 302 and 304 respectively. The notches 120 and 121 in this embodiment, are designed to provide an entry passage for insertion of the attachment lips 144 and 146, as well as necessary clearance for when the gripping modules 140 and 142 are first inserted prior to their rotation along 302 and 304. Once this attachment is completed, the pulling together of the ends of the ratchet bar 1 will also pull together the gripping modules 140 and 142.

While the particular embodiment depicted for attaching the gripping modules 140 and 142 to the ends of the ratchet bar 1 uses the lips 144 and 146 in conjunction with attachments 116 and 118, it is understood that a wide variety of methods to facilitate such attachment are known to those in the art and could be implemented easily without undue experimentation, and are encompassed herein. For example, without limitation, the ends of the ratchet 1 and the gripping modules 140, 142 can screw together, using complementary male and female receptacles therefor, or they can be clamped or locked together in a variety of ways known in the art. Any means of attachment known in the art is acceptable, so long as it simultaneously preserves the ability of the ratchet bar 1 to properly mate with the vehicle lifting base 122 and the vehicle lifting mount 126 when the bar 1 is being used in a "push" application as well, such as a vehicle jack, FIG. 2.

The upper and lower gripping modules 140 and 142, which in the preferred embodiment are identical to and interchangeable with each other (though one of ordinary skill can readily envision ways of making them non-identical while nevertheless providing equivalent function), each comprise a pair of grip wings 148 and 150 (upper), and 152 and 154 (lower). Each grip wing has an outer grip wing surface 156 and an inner grip wing surface 158. In the perspective view of FIGS. 1 and 3, the outer surface 156 is expressly depicted on the upper gripping module 140, and the inner surface 158 is expressly shown on the lower gripping module 142, but it is understood that each module 140 and 142 has both an inner (158) and outer (156) such surface.

Figure 2:
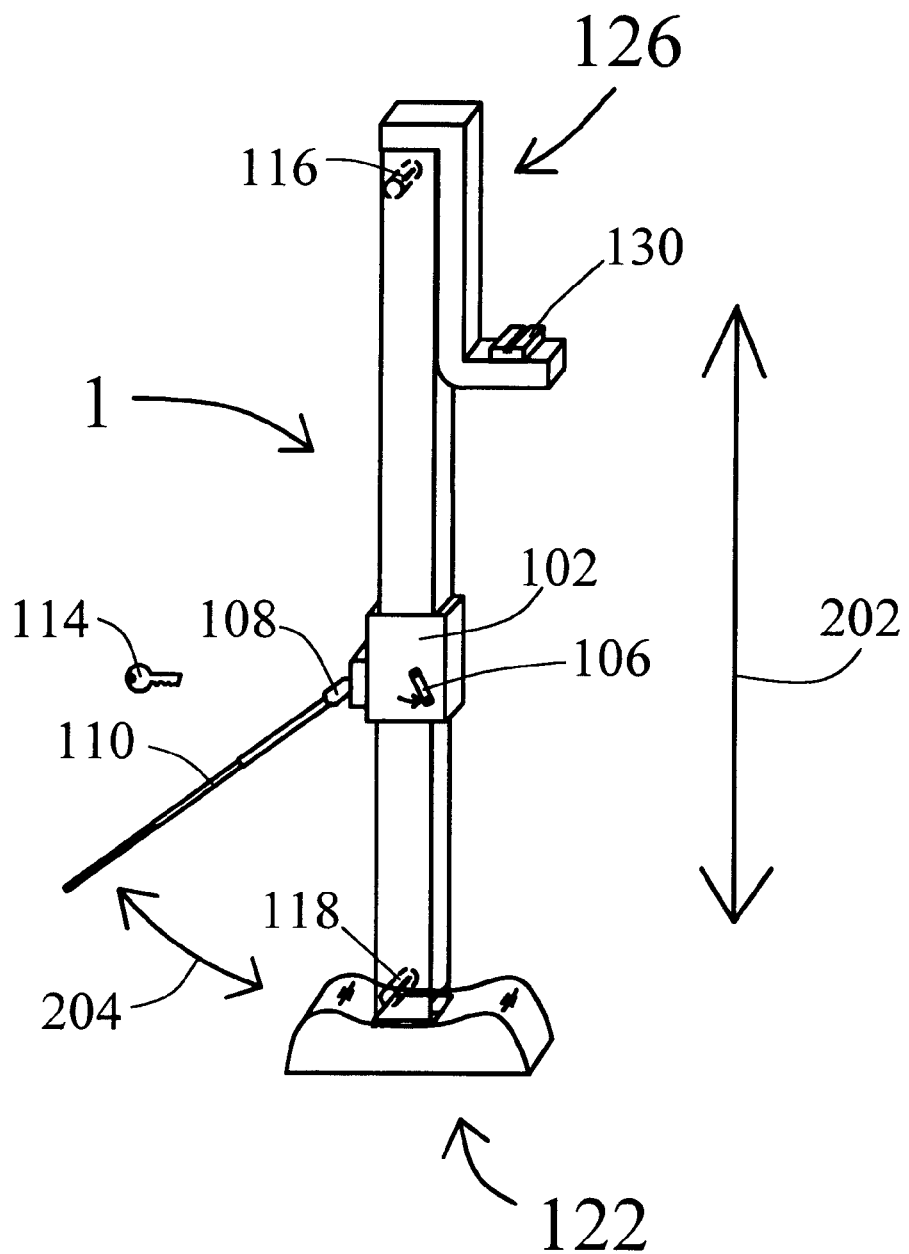
FIG. 2 depicts the preferred embodiment of the invention, when it is configured as a standard vehicle lifting jack.

Once the gripping modules 140 and 142 have been attached to the ratchet bar 1 as shown in FIG. 3, the directional selection mechanism 106 is switched to the alternate position from that shown in FIG. 2, as shown in FIG. 3, which now causes the ratchet bar 1 to pull together along the arrows 306, rather than push apart as in FIG. 2 (202). The entire assembled mechanism is then expanded to a vertical length slightly greater than the diameter of the tire to which the device is being attached, and the wings 148, 150, 152, 154 are placed around the tire with their inner surfaces 158 almost in contact with the tread of the subject tire 308 (FIG. 3, right-hand drawing, shows a cutaway view of the tire). The handle 110 is then pumped up and down in the customary manner 204, and the ratchet bar 1 causes the inner surfaces 158 of the wings 148, 150, 152, 154 to come tightly into contact with various locations around the circumference of the tire, i.e., across the tire tread. (Four contact points are shown in the preferred embodiment, though a change in this number of contact points, or in the spacing of these contact points, would be an obvious variation.) These inner surfaces 158 are fabricated of, or coated with, any suitable material, for example, rubber, which, when pressed against the rubber surface of the tire tread, will offer a very high degree of friction against said surface and therefore will not slip against the tire. The outer surfaces 156 are critical to provide friction with the roadway surface and any ice, mud, snow, etc., from which the vehicle is being extracted, and so are fabricated out of, or made to comprise, for example, linked chains (such as used in ordinary tire chains), spikes, studs, or any other rough, high-friction surface that will grip and increase friction with the roadway so as to facilitate extraction of the vehicle.

Once this device so-configured has been mounted on a drive tire 308 of the vehicle as shown on the right side of FIG. 3, and optionally locked 112 into place to provide added safety against the ratchet bar 1 disengaging while in use, the vehicle operator simply engages the accelerator of the vehicle, which causes the drive tire 308 to begin rotation. The outer surfaces 156 of the wings 148, 150, 152, 154 provide added friction with the roadway surface while the drive tire rotates, and this added friction facilitates extraction of the vehicle from the adverse road condition in question. Several variations and enhancements to this anti-skid functionality will be discussed later in connection with FIG. 6.

Figure 4:
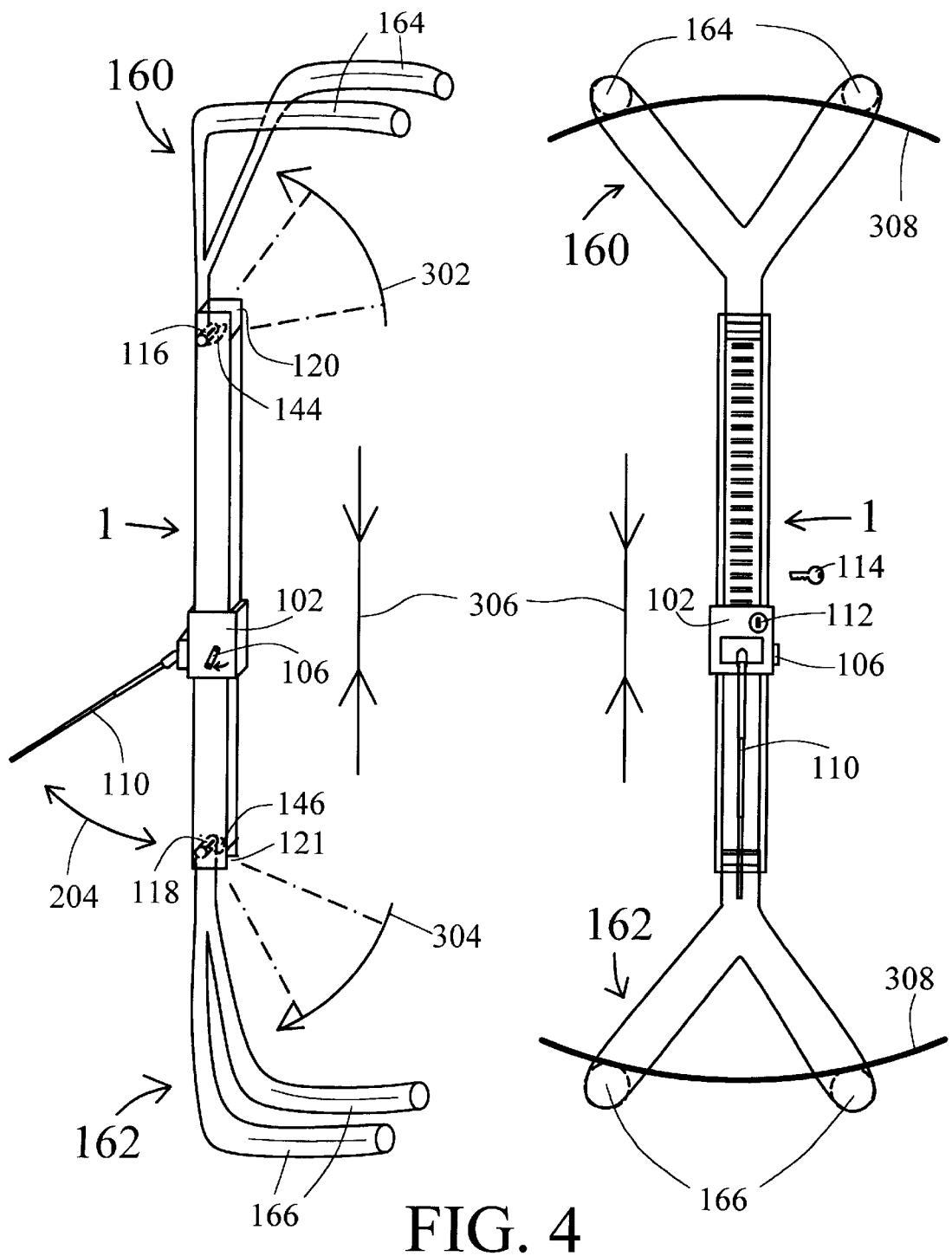
FIG. 4 depicts the preferred embodiment of the invention when it is configured as a security lock (boot) for a vehicle tire.

FIG. 4 depicts the preferred embodiment of the invention when configured as a security (anti-theft) tire boot. The assembly and operation for this application is virtually the same as it is for the anti-skid application of FIG. 3, with upper (160) and lower (162) tire boot modules replacing the upper (140) and lower (142) anti-skid gripping modules (see also FIG. 1). The upper boot module 160 comprises a pair of upper boot blocks 164, while the lower boot module 162 comprises a pair of lower boot blocks 166. These boot modules 160 and 162 are attached to the ratchet bar 1 in precisely the same manner as the anti-skid (gripping) modules 140 and 142 via upper pull module attachment 144 and lower pull module attachment 146, such as the upper and lower attachment lips 144 and 146 depicted on modules 160 and 162 (and 170, 172, yet to be discussed) in FIG. 1. All of the considerations earlier discussed with respect to the attachment of gripping modules 140 and 142 to the ratchet bar 1 apply just as fully to boot modules 162 and 164 (and 170, 172).

Once the configuration of FIG. 4 has been assembled, and the boot modules placed appropriately adjacent to several (four in the preferred embodiment, though this number may again be varied within the scope and spirit of the invention) locations adjacent to the circumference (tread) of the tire 308, the ratchet bar 1, again set via switch 106 to a pulling (306) position, is activated with handle 110 to pull the two boot modules together and secure them tightly to the tire. Again, the (inner) surfaces of the boot blocks 164 and 166 that contact the tire are constructed or coated with a material, such as rubber, that will adhere tightly to the tire tread. Once the boots are placed tightly about the tire, the lock 112 is locked, so that the boot cannot be removed from the tire without the unlocking device 114. Heretofore, the use of the lock 114 to deactivate the ratchet bar drive mechanism 102 provided safety against the bar disengaging while the vehicle was jacked up, or while the gripping modules were secured about the tires. Now, for the use of boot modules 160 and 162, the locking of the drive mechanism 102 serves in fact to lock the boot about the tire, so it cannot be removed by someone who does not possess the unlocking device 114, e.g., a vehicle thief. Once the boot is locked on the tire, the owner can leave the vehicle with the knowledge that it cannot be driven away by anyone else.

Figure 5:
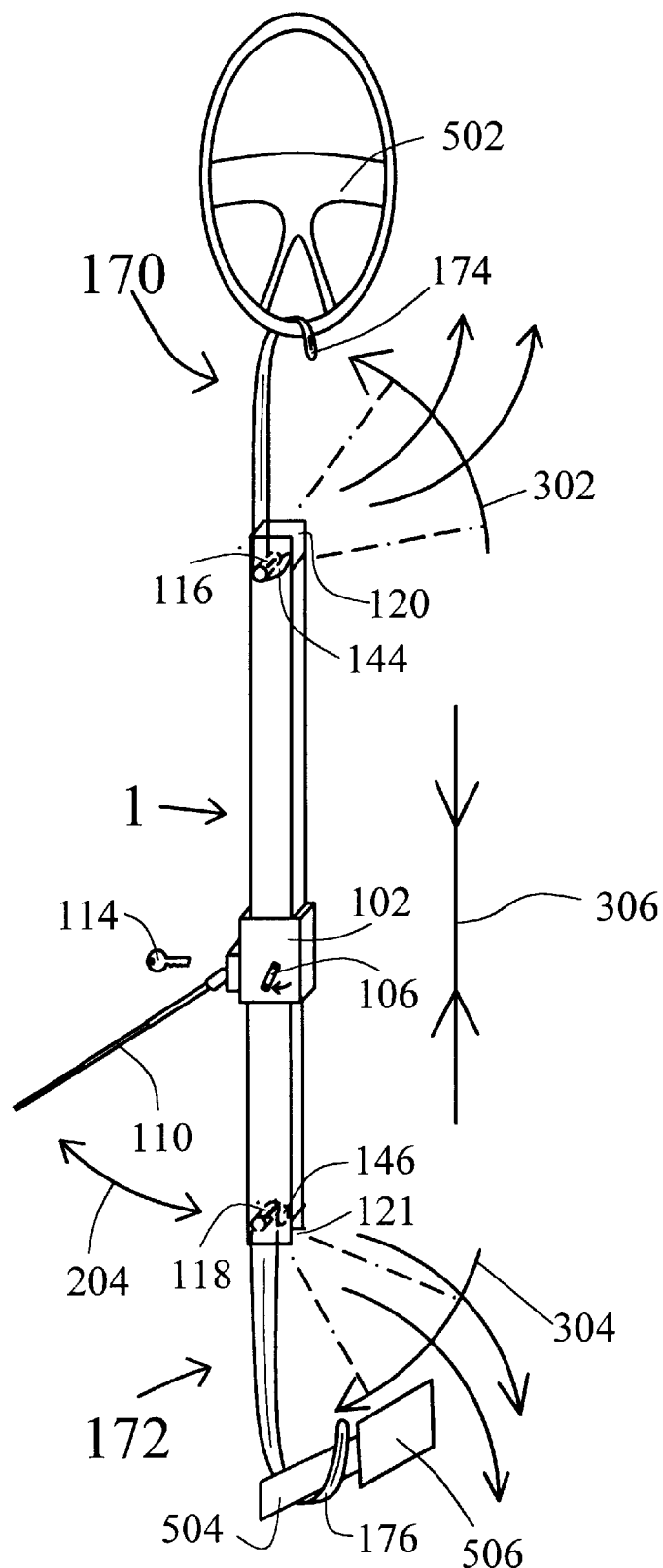
FIG. 5 depicts the preferred embodiment of the invention when it is configured as a steering wheel/brake lock.

FIG. 5 depict the use of a steering wheel restraining module 170 with steering wheel hook 174, and a brake shaft attachment module 172 with brake shaft hook 176, in conjunction with ratchet bar 1, when the bar 1 is again switched (106) to pull together (306). These modules 170 and 172 may be an identical, interchangeable pair of modules (though differences between them are encompassed within the spirit of this invention), and are attached to the ratchet bar 1 via the same upper pull module attachments 144 and lower pull module attachments 146, such as the upper and lower attachment lips earlier depicted in connection with modules 140 and 142, and 160 and 162, in FIG. 1. Again, all of the attachment considerations earlier discussed apply here as well.

Once these modules 170 and 172 are attached to the ratchet bar 1 as discussed above, the steering wheel hook 174 is hooked around the vehicle's steering wheel 502, the brake shaft hook 176 is hooked around the vehicle's brake shaft 504 (shown connected to the brake pedal 506), and the ratchet bar 1 is tightened to provide enough pull on the steering wheel 502 so that it cannot be turned. The lock 112 (obscured by the right-rear view in FIG. 5) on the drive mechanism 102 is then locked, so that the vehicle is secured against theft. To remove the configuration of FIG. 5, the lock 112 is unlocked (114), and the ratchet bar released.

Figure 6:
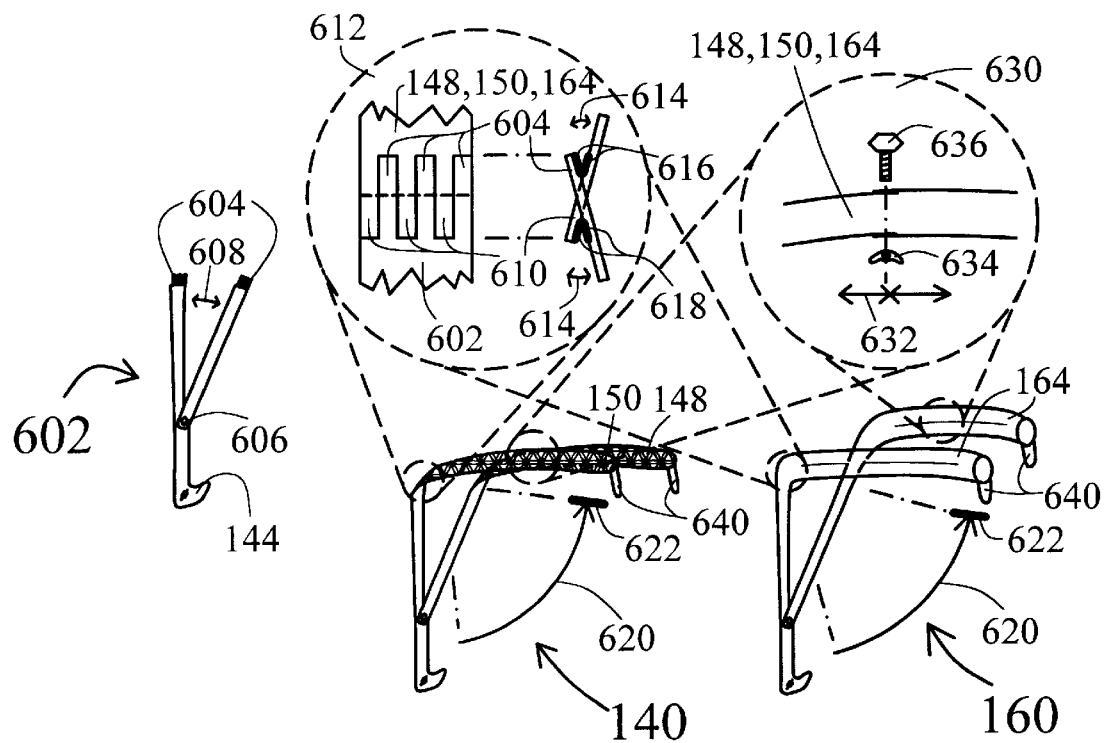
FIG. 6 depicts some variations of and enhancements to the preferred embodiment of the invention.
Figure 6:
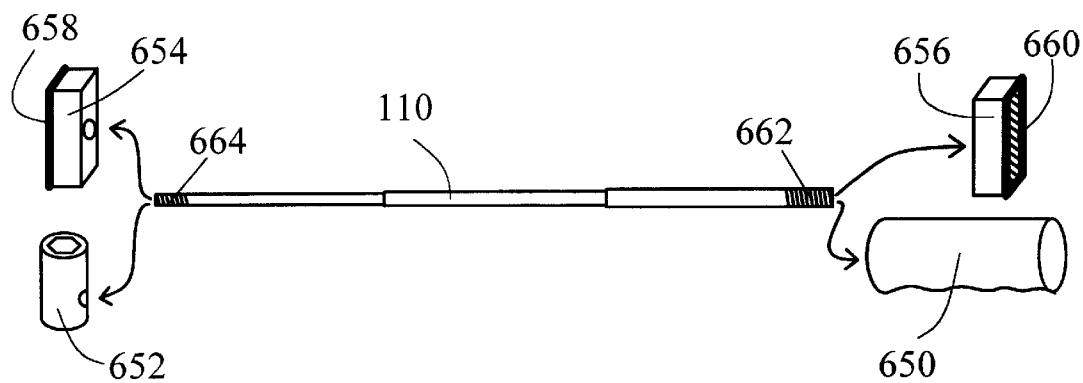

FIG. 6 illustrates, without limitation, some further variations and enhancements to the preferred embodiment of the invention.

The upper half of FIG. 6 illustrates some further enhancements involving the upper and lower anti-skid gripping (friction-enhancing) modules 140 and 142, and the upper and lower boot modules 160 and 162. While only the upper said modules (140 and 160) are illustrated, it is understood that the discussion to follow applies equally to the lower said modules (142 and 162).

It is desirable, in addition in incorporating multiple safety and security functions into this invention as outlined above, to also have an invention which is highly modular and can be stored compactly in a limited vehicle cargo space. As illustrated in the earlier discussions of modules 140, 160 and 170, it is not only possible, but indeed desirable for all of these (upper) modules, as well as their lower counterparts (142, 162, 172) to attach to the ratchet bar 1 in a common manner. The pull module attachments 144 and 146 such as the lips depicted, in conjunction with ratchet bar pull module attachments 116 and 118, illustrate one means of achieving such attachment, though again, as discussed above, there are many other suitable ways of performing this attachment that will be obvious to someone of ordinary skill and that fall squarely within the scope of this invention.

Given this common manner of attachment to the ratchet bar 1, it is possible to identify the "Y" section of 140 and 160 as a common module separate from the wings of 140 and 160 that make operative contact with the tire tread. Thus, a common attachment module 602 may be utilized for both 140 and 160 and their lower counterparts. In the illustrative embodiment shown on FIG. 6, this common attachment module 602 has a set of first attachment fingers 604 and a collapsing hinge 606, as well as the attachment 144 earlier discussed and illustrated. When not in use, the upper "Y" portion of 144 is folded (compacted) together so that 602 is essentially a unidimensional bar. For use, 144 is unfolded about the hinge 606 as depicted by arrow 608.

The grip wings 148 and 150, as well as the boot blocks 164 (and all lower counterparts) are now configured as distinctly separate modules. These modules attach to common attachment module 602 via a set of second attachment fingers 610 which are complementary to, and which mate with, the first finger set 604. As shown from the projection of these fingers in the exploded view 612, these finger sets 604 and 610 are first overlapped and interlocked, and are then rotated in the direction of 614 to make contact with the corresponding "knuckles" of the complementary module. Arrows 620 show another (more global) view of this rotation 614. Complementary adhesion members 616, as well as 618, which in the preferred embodiment are made of Velcro®, will then join together and hold the fully assembled modules 140, 160 in place. These assembled modules are then attached to the ratchet bar 1 as earlier described, and when the ratchet bat is tightened about the tire 308 as earlier discussed, the overlapping, interlocking configuration of fingers 604 and 610 will allow the modules 140 and 160 to be rotated along the direction indicated by 620, and then will serve to stop further rotation, as indicated by the stop line 622 draw at the head of arrow 620. The adhesion members 616 and 618 serve to hold the modules 140 and 160 in place while they are being assembled for use. Once the ratchet bar 1 with modules 140 or 160 has been tightened about the tire 308, the pressure of the wings 148, 150, 164 against the tire, coupled with the finger configuration, serves to hold the modules firmly in place.

Alternatively, though not depicted here, the wings 148, 150, and 164, can be made in a unitary manner with attachment module 602, with a permanent hinge that allows them to rotate in the direction of arrow 620, and be stopped at position 622 (the fingers are still useful for this purpose, though the complementary adhesion members 616 and 618 are not needed, as their function is replaced by that of the permanent hinge. When not in use, these units may be folded up for compact storage in the direction opposite arrowhead 620, as well as opposite 608.

It is also desirable to be able to adjust the lengths of the wings 148, 150, 164 so as to conform to a tire of any depth, i.e., of any tread width. Thus, in an alternative preferred embodiment, the wings on modules 140 and 160 are made to telescope to a range of lengths, as shown schematically in exploded view 630. In particular, by "breaking" each wing into two partially-overlapping sections, and enabling telescoping motion along the arrows 632, the length of the wings may be pre-adjusted for varying tire depths, i.e., tread widths. In the very simple embodiment depicted in 630, a simple nut 634 and bolt 636 (or a plurality of nuts and bolts), which should recess beneath the surface of the wings so as to not interfere with either the tire surface contact or the road surface contact, can be used to pre-adjust the wings 148, 150, 164 to the desired lengths. Many alternative means for adjusting the wing lengths will also be obvious to someone of ordinary skill, and are encompassed within the scope of this disclosure and its associated claims. Tire stops 640 are optionally added to the ends of the wings as well, to press against the rear (hidden) face of the tire once the wings are secured about the tire, adding to the strength of the grip between the wings and the tires. Other variations to achieve the same modularity and compactness, and various combinations of what has been suggested above, will also occur to someone of ordinary skill, and are also encompassed hereby.

The telescoping drive handle 110 can be used for a range of functions. Of course, it is used to drive the ratchet bar 1 as discussed above. When a grip handle 650 and a nut socket 652 are attached (for example, by the depicted screw threads 662, 664) to the ends of the drive handle 110, the drive handle 110 may be used to supply the necessary leverage for unscrewing, e.g., tire bolts. When complementary attachment pad members 654 and 656 with pads 658, 660 are attached (e.g. screwed) to the ends of handle 110, the handle may also be used, for example, as a pickup truck bed bar, or a clothing hanger, or a cargo restraint, etc. That is, it can be used as a bar for any situation in which a convenience bar is desired. For these applications, the telescoping drive handle 110 should be additionally fitted with means to prevent its compression once it is expanded to the desired length, which can combine one or more of, e.g., springs, pegs, screws, etc. (not shown), in ways that are well known in the art and easily implemented for the purposed described here.

As described above, this invention, and the many variations thereof that are herein disclosed or will be obvious to someone of ordinary skill, enable a vehicle user to have available a compact, versatile safety and security system that serves as a lifting jack, an anti-skid tire friction enhancer, a tire boot, a steering wheel lock, a leg nut wrench, and a convenience bar. This system provides vastly enhanced safety and security functionality as compared with an ordinary jack, using but a few additional modular, compact components. As such, it can add to the safety and security, and peace-of-mind, of motor vehicle operators everywhere. It is also easy to use, and can be assembled and disassembled quickly in an emergency.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A safety and security system for a motor vehicle, comprising:
    a reversible ratchet bar capable of being set to push apart upper and lower ends thereof, and alternatively, to pull together said upper and lower ends thereof;
    a vehicle lifting base attaching to said lower end of said reversible ratchet bar;
    a vehicle lifting mount attaching to said upper end of said reversible ratchet bar;
    at least one upper and lower pull module pair comprising an upper member and a lower member; said at least one upper and lower pull module pair including an upper and lower tire gripping module pair attaching to said upper and lower ends of said reversible ratchet bar; wherein:
    when said vehicle lifting base and said vehicle lifting mount are attached, respectively, to lower and upper ends of said reversible ratchet bar, and a ratcheting direction of said ratchet bar is set to push apart said ends of said reversible ratchet bar, and said vehicle lifting base is placed upon a ground surface beneath said motor vehicle while said vehicle lifting mount is placed in a lifting position against an underside of said motor vehicle, the actuation of said ratchet bar pushes apart said vehicle lifting base and said vehicle lifting mount thereby lifting said motor vehicle; and,
    when said upper and lower tire gripping modules are alternatively attached, respectively, to said upper and lower ends of said reversible ratchet bar in place of said vehicle lifting base and said vehicle lifting mount, and the ratcheting direction of said ratchet bar is set to draw together said ends of said reversible ratchet bar, the actuation of said ratchet bar draws together and clamps said upper and lower tire gripping modules to a drive tire of said motor vehicle, thereby adding traction to said drive tire.

2. The system of claim 1, said ratchet bar further comprising means for locking and unlocking said ratchet bar.

3. The system of claim 1, further comprising a drive handle used to activate said ratchet bar, said drive handle further comprising means for telescoping from a contracted to an expanded elongation.

4. The system of claim 1, the members of said upper and lower tire gripping module pair comprising means enabling adjustment to varying widths.

5. The system of claim 3, said drive handle comprising means enabling said drive handle to be adapted to operate as a wrench.

6. The system of claim 3, said drive handle comprising means enabling said drive handle to be adapted to operate as a convenience bar.

7. A method of improving motor vehicle safety and security; comprising the steps of:
    when it is desired to create an assembly capable of being used as a vehicle lifting jack, attaching a vehicle lifting base and a vehicle lifting mount, respectively, to an lower and upper end of a reversible ratchet bar, and setting a ratcheting direction of said ratchet bar such that said ends and hence said lifting base and lifting mount are pushed apart upon activation of said ratchet bar, whereby, when said vehicle lifting base is placed upon a ground surface beneath said motor vehicle while said vehicle lifting mount is placed in a lifting position against an underside of said motor vehicle, the actuation of said ratchet bar pushes apart said vehicle lifting base and said vehicle lifting mount thereby lifting said motor vehicle; and
    when it is desired to create an assembly capable of performing an operation that pulls together the members of at least one an upper and lower pull module pair comprising an upper member and a lower member, attaching said pull module pair members, respectively, to said upper and lower ends of said ratchet bar, and setting a ratcheting direction of said ratchet bar such that the said ends and hence said upper and lower pull module pair members are drawn together upon activation of said ratchet bar; wherein:
        the members of said at least one upper and lower pull module pair comprise, respectively, upper and lower tire gripping modules, said operation is adding traction to a drive tire of said motor vehicle, and actuating said ratchet bar thereby draws together and clamps said upper and lower tire gripping modules to said drive tire thereby adding traction to said drive tire.

8. The system of claim 1, said at least one upper and lower pull module pair further comprising an upper and lower tire boot module pair.

9. The system of claim 1, said at least one upper and lower pull module pair further comprising a steering wheel restraining module and brake shaft module pair.

10. The system of claim 1, said at least one upper and lower pull module pair further comprising an upper and lower tire boot module attaching to said upper and lower ends of said reversible ratchet bar, and said ratchet bar further comprising means for locking and unlocking said ratchet bar, wherein:
    when said upper and lower tire boot modules are alternatively attached, respectively, to said upper and lower ends of said reversible ratchet bar in place of said vehicle lifting base and said vehicle lifting mount, and the ratcheting direction of said ratchet bar is set to draw together said ends of said reversible ratchet bar, the actuation of said ratchet bar draws together and clamps said upper and lower tire boot modules to a tire of said motor vehicle, thereby immobilizing said vehicle once said ratchet bar is locked.

11. The system of claim 1, said at least one upper and lower pull module pair further comprising a steering wheel restraining module and brake shaft module pair attaching to said upper and lower ends of said reversible ratchet bar, and said ratchet bar further comprising means for locking and unlocking said ratchet bar, wherein:

when said steering wheel restraining module and said brake shaft module are alternatively attached, respectively, to said upper and lower ends of said reversible ratchet bar in place of said vehicle lifting base and said vehicle lifting mount, and the ratcheting direction of said ratchet bar is set to draw together said ends of said reversible ratchet bar, the actuation of said ratchet bar draws together and clamps said steering wheel restraining module and said brake shaft module between a steering wheel and a brake of said motor vehicle, thereby preventing said vehicle from being driven once said ratchet bar is locked.

12. The system of claim 10, said at least one upper and lower pull module pair further comprising a steering wheel restraining module and brake shaft module pair attaching to said upper and lower ends of said reversible ratchet bar, wherein:

when said steering wheel restraining module and said brake shaft module are alternatively attached, respectively, to said upper and lower ends of said reversible ratchet bar in place of said vehicle lifting base and said vehicle lifting mount, and the ratcheting direction of said ratchet bar is set to draw together said ends of said reversible ratchet bar, the actuation of said ratchet bar draws together and clamps said steering wheel restraining module and said brake shaft module between a steering wheel and a brake of said motor vehicle, thereby preventing said vehicle from being driven once said ratchet bar is locked.

13. The system of claim 8, the members of said upper and lower tire boot module pair comprising means enabling adjustment to varying width.

14. The method of claim 7, wherein the members of said at least one upper and lower pull module pair further comprise, respectively, upper and lower tire boot modules, said operation is preventing rotation of a tire of a vehicle and thereby immobilizing said vehicle, and actuating said ratchet bar thereby draws together and clamps said upper and lower tire boot modules to a tire of said motor vehicle thereby immobilizing said vehicle once said ratchet bar is locked using ratchet bar locking and unlocking means.

15. The method of claim 7, wherein the members of said at least one upper and lower pull module pair further comprise, respectively, a steering wheel restraining module and brake shaft module pair, said operation is locking a steering wheel and a brake of a vehicle, and actuating said ratchet bar draws together and clamps said steering wheel restraining module and said brake shaft module between a steering wheel and a brake of said motor vehicle, thereby preventing said vehicle from being driven once said ratchet bar is locked using ratchet bar locking and unlocking means.

16. The method of claim 14, wherein the members of said at least one upper and lower pull module pair further comprise, respectively, a steering wheel restraining module and brake shaft module pair, said operation is locking a steering wheel and a brake of a vehicle, and actuating said ratchet bar draws together and clamps said steering wheel restraining module and said brake shaft module between a steering wheel and a brake of said motor vehicle, thereby preventing said vehicle from being driven once said ratchet bar is locked using ratchet bar locking and unlocking means.

17. The system of claim 8, said at least one upper and lower pull module pair further comprising a steering wheel restraining module and brake shaft module pair.

\* \* \* \* \*